(12) United States Patent
Hi Sim et al.

(10) Patent No.: US 7,876,724 B2
(45) Date of Patent: Jan. 25, 2011

(54) PERFORMING PRESENCE SERVICE IN A WIRELESS COMMUNICATION SYSTEM

(75) Inventors: Dong Hi Sim, Seoul (KR); Ji Young Huh, Gyeonggi-do (KR); Jae Young Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 668 days.

(21) Appl. No.: 11/871,464

(22) Filed: Oct. 12, 2007

(65) Prior Publication Data

US 2008/0107066 A1   May 8, 2008

Related U.S. Application Data

(60) Provisional application No. 60/864,773, filed on Nov. 7, 2006, provisional application No. 60/864,775, filed on Nov. 7, 2006, provisional application No. 60/866,197, filed on Nov. 16, 2006, provisional application No. 60/866,366, filed on Nov. 17, 2006.

(30) Foreign Application Priority Data

Jan. 6, 2007   (KR) .................. 10-2007-0001815

(51) Int. Cl.
*H04W 4/00* (2009.01)
(52) U.S. Cl. .................... 370/328; 455/456.1
(58) Field of Classification Search ............. 370/328, 370/338; 455/432.1, 433, 404.2, 456.1
See application file for complete search history.

(56) References Cited

U.S. PATENT DOCUMENTS

| 6,757,722 | B2 | 6/2004 | Lonnfors et al. |
| 7,142,856 | B2 | 11/2006 | Barrow |
| 7,333,819 | B2 * | 2/2008 | Caspi et al. .............. 455/456.5 |
| 7,450,531 | B2 * | 11/2008 | Iyer et al. .................. 370/310 |
| 2003/0037103 | A1 | 2/2003 | Salmi et al. |
| 2004/0192353 | A1 | 9/2004 | Mason et al. |
| 2005/0207381 | A1 * | 9/2005 | Aljadeff et al. ............. 370/338 |
| 2005/0265296 | A1 | 12/2005 | Zhang et al. |
| 2006/0045042 | A1 | 3/2006 | Sethi et al. |
| 2006/0062183 | A1 | 3/2006 | Forte et al. |
| 2006/0167628 | A1 | 7/2006 | Karaoguz et al. |
| 2009/0222669 | A1 * | 9/2009 | Huang et al. ................ 713/182 |

FOREIGN PATENT DOCUMENTS

KR   10-2006-0003197   1/2006

OTHER PUBLICATIONS

J. Peterson, "A Presence-based GEOPRIV Location Object Format," Network Working Group, RFC 4119, Dec. 2005, <http://www.networksorcery.com/enp/rfc/rfc4119.txt>.

P.M. Carpenter et al., "Standardised Service Capabilities: The Need for Standardization Illustrated by the Development of the Presence Service," Third International Conference on 3G Mobile Communication Technologies (Conf. Publ. No. 489), May 2002, pp. 360-365.

* cited by examiner

*Primary Examiner*—Brian D Nguyen
(74) *Attorney, Agent, or Firm*—Lee, Hong, Degerman, Kang & Waimey

(57) ABSTRACT

The present invention relates to perform presence service in a wireless communication system that is available to a mobile device.

10 Claims, 10 Drawing Sheets

|  | Element ID (1) | Length (7) | Normal Report Interval | Normal number of frames per channel | In-Motion Report Interval | In-Motion number of frames per channel | Inter-frame Interval |
|---|---|---|---|---|---|---|---|
| Octets: | 1 | 1 | 2 | 1 | 2 | 1 | 1 |

|  | Element ID (2) | Length (2x number of channels + 1) | Number of channels | Channel 1 | Regulatory Class | Channel n | Regulatory Class |
|---|---|---|---|---|---|---|---|
| Octets: | 1 | 1 | 1 | 1 | 1 | 1 | 1 |

FIG. 7

| | Element ID (3) | Length (2) | Options |
|---|---|---|---|
| Octets: | 1 | 1 | 2 |

FIG. 8

| | Element ID (4) | Length (1) | Status |
|---|---|---|---|
| Octets: | 1 | 1 | 1 |

FIG. 9

| | Element ID (5) | Length (3) | Location Service State | Location Service Interval |
|---|---|---|---|---|
| Octets: | 1 | 1 | 1 | 2 |

FIG. 10

| | Element ID (6) | Length (5) | Transmit Power | Antenna ID | Antenna Gain | Received RSNI | RCPI |
|---|---|---|---|---|---|---|---|
| Octets: | 1 | 1 | 1 | 1 | 1 | 1 | 1 |

FIG. 11

| | Element ID (7) | Length (6) | Timestamp Difference | Timestamp Difference Units | Timestamp Difference Accuracy |
|---|---|---|---|---|---|
| Octets: | 1 | 1 | 4 | 1 | 1 |

FIG. 12

| | Element ID (8) | Length (3) | Motion Indicator | Speed |
|---|---|---|---|---|
| Octets: | 1 | 1 | 1 | 2 |

FIG. 13

|  | Element ID (9) | Length (3) | Location Descriptor | Location Resolution Descriptor | Encoding Descriptor |
|---|---|---|---|---|---|
| Octets: | 1 | 1 | 1 | 1 | 1 |

FIG. 14

|  | Element ID (10) | Length (variable) | Location Accuracy Estimate | Location Value |
|---|---|---|---|---|
| Octets: | 1 | 2 | 0..4 | variable |

FIG. 15

|  | Element ID (11) | Length (variable) | Time zone Offset | Location Timestamp | Public Identifier Link |
|---|---|---|---|---|---|
| Octets: | 1 | 2 | 1 | 6 | variable |

BEACON

PROBE

PRESENCE CONFIGURATION

|         | Category | Action | Dialog Token | Presence Parameters Element |
|---------|----------|--------|--------------|------------------------------|
| Octets: | 1        | 1      | 1            | Variable                     |

|         | Category | Action | Dialog Token | Presence Parameters Element |
|---------|----------|--------|--------------|------------------------------|
| Octets: | 1        | 1      | 1            | Variable                     |

|         | Category | Action | Dialog Token | Presence Parameters Element |
|---------|----------|--------|--------------|------------------------------|
| Octets: | 1        | 1      | 1            | Variable                     |

|  | Category | Action | Dialog Token | Presence Parameters Element |
|---|---|---|---|---|
| Octets: | 1 | 1 | 1 | variable |

PERFORMING PRESENCE SERVICE IN A WIRELESS COMMUNICATION SYSTEM

CROSS-REFERENCE TO RELATED APPLICATIONS

The present application claims priority from Korean Patent Application No. 10-2007-0001815, filed in Korea on Jan. 6, 2007 and from U.S. patent 60/864,773, 60/864,775, 60/866,197, 60/866,366, filed in U.S. on Nov. 7, 2006, Nov. 7, 2006, Nov. 16, 2006 and Nov. 17, 2006 the entire contents of each is incorporated herein by reference.

BACKGROUND

1. Field of the Invention

The present invention relates to perform presence service in a wireless communication system that is available to a mobile device.

2. Related Art

The demand for wireless communications has enjoyed tremendous growth over recent years and indeed, wireless communication technology is used every day by millions around the world to send, receive, and exchange information using pagers, cellular telephones, wireless personal digital assistants, and other wireless communication products. Recently, the revolution in wireless communication technologies has carried over to business and personal computing. Wireless communication technology now permits computer users to access and share information and data, without being tethered by wire to a computer network infrastructure traditionally used to connect computing devices.

Owing to the increased availability of wireless networks, laptop and notebook computer users are able to perform their tasks with increased mobility. For example, a user can take his or her laptop from their desk into a conference room to attend a meeting and still have access to the network to retrieve data and have access to the Internet via one or more modems or gateways present on the network all without being tethered by a wired connection. Similarly, mobile computer users and business travelers commonly use their portable computers to gain access to their email accounts, to determine if there is any unread email, and to read and send email. Still further, being able to connect to the Internet permits the user to perform these tasks and others without having to suffer through the lackluster performance provided by conventional 56 K modem connections which use the telephone network to establish communications. Indeed, high speed Internet access via a WAP is highly desirable when considered vis-a-vis a connection made via use of a conventional 56 K modem. Thus, as more and more laptop and notebook computers are being equipped with integrated wireless network adapters, the implementation of wireless LANs in the business environment, and even within residences, is surely to expand.

A further expansion of the use of wireless computer networks now permits laptop and notebook computer users to use their portable computing devices to access public and private computer networks at locations away from their own office or home networks. Internet service providers, telecommunications companies, and wireless network providers have begun to install WAPs in locations such as airport lounges, hotel lobbies, and coffee bars. WAPs are being established at these and other public locations where business travelers and general computer users often congregate. These types of public WAPs are typically referred to as "hotspots." A typical hotspot permits a wireless computer user to gain access to a computer network via a wireless connection created between the wireless network adapter in the user's computer and the public WAP. The hotspot WAP permits the user to gain access to an IP address associated with a modem or gateway to enable the computer user to access the Internet and, potentially, other local network resources, such as printers, which are associated with the hotspot.

SUMMARY

The present invention relates to perform presence service in a wireless communication system that is available to a mobile device.

According to one aspect of the present invention, there is provided a method of advertising presence information for a station in a wireless communication system, the method comprising: constructing a data including a presence parameters information element, wherein the presence parameters information element comprises either a location descriptor to provide its own location capability or a location data to provide its own location information if the station is capable of calculating its own location; transmitting the presence parameters information elements including either the location descriptor or the location data for one station without request of either its location descriptor or its location data to advertise its location information to other station; and reporting the result of transmitting the data.

According to another aspect of the present invention, there is provided a station in a wireless communication system: the station comprises a constructing means for constructing a data including a presence parameters information element, wherein the presence parameters information element comprises either a location descriptor to provide its own location capability or a location data to provide its own location information if the station is capable of calculating its own location; a transmitting means for transmitting the presence parameters information elements including either the location descriptor or the location data for one station without request of either its location descriptor or its location data to advertise its location information to other station; and a reporting means for reporting the result of transmitting the data.

The presence parameters information element comprises both the location descriptor to provide its own location capability and the location data to provide its own location information and the station transmits the presence parameters information elements including either the location descriptor or the location data for one station without request of both its location descriptor and its location data to advertise its location information to other station.

The location data of the presence parameters information element matches the format defined by the location descriptor.

The data presence parameters information element is included in one or more of the beacon, the probe request, the presence configuration request, the presence request, the association request or the reassociation request.

Either the station or other station is the access point that has station functionality.

BRIEF DESCRIPTION OF THE DRAWINGS

The above aspects of the present invention will be more apparent by describing certain exemplary embodiments of the present invention with reference to the accompanying drawings, in which:

FIG. 4 is the flowchart of the communicating method according to the other embodiment.

FIGS. 5 to 15 shows the formats of the Presence Indication Parameters sub-element.

DETAILED DESCRIPTION

Hereafter, embodiments of the present invention will be explained in detail with reference to the accompanying drawings. Further, a wireless RAN system among wireless network systems will be explained as one example of the embodiments of the present invention.

However, the embodiments of the present invention may be applied to the wireless RAN system as well as various wireless network systems. Terms or words used for the embodiments of the present invention may be used as different terms or words in the various wireless network systems. Accordingly, if practicable meanings of the terms or words are the same or similar, the terms or words are regarded as the same.

Wireless Network System

Figure 1A:
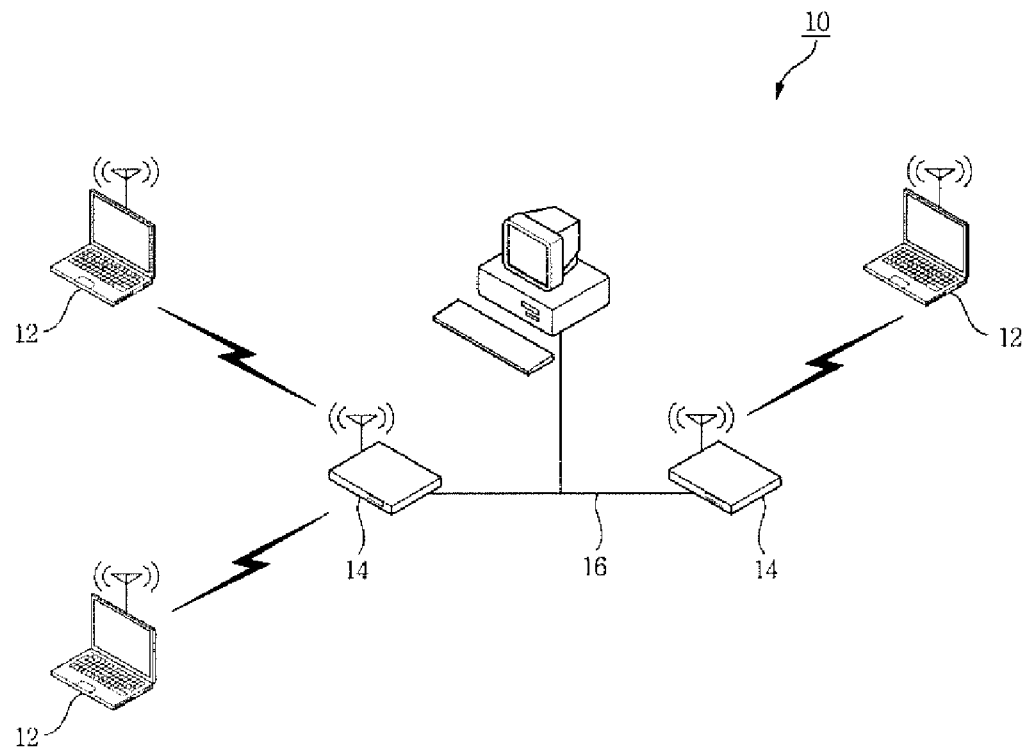
FIGS. 1A and 1B are a concept diagram illustrating a wireless network system according to exemplary embodiments of the present invention.
Figure 1B:
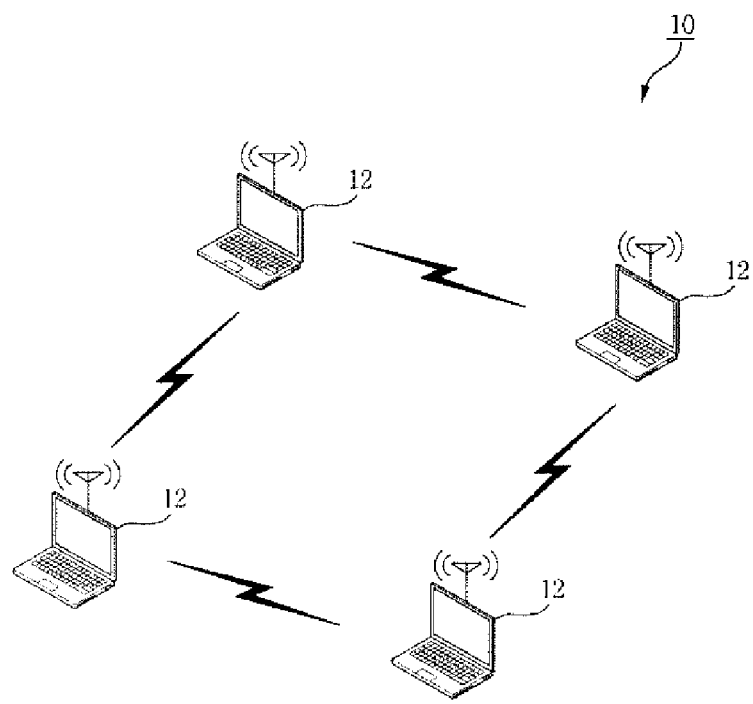

FIGS. 1A and 1B are a concept diagram illustrating a wireless network system according to exemplary embodiments of the present invention. The same constituent elements of FIGS. 1a and 1B use the same drawing number.

Referring to FIG. 1A, a wireless network system, for example, a wireless LAN system 10 includes a plurality of stations or terminals 12, an access point or wireless base station 14 and a backbone network or a distribution system 16.

The plurality of stations 12 mounts a network interface card for a wireless LAN to perform an operation of a physical layer and a MAC layer based on IEEE 802.11 standard. In the wireless LAN system 10 of FIG. 1A, the plurality of stations 12 is connected to the access point 14 to transmit a data frame.

The access point 14 performs wire and wireless interworking bridge function for relaying a frame transmitted from one station to other station. The access point 14 performs the same function as a bridge or a switch of an Ethernet.

Further, the access point 14 basically includes the same the physical layer and MAC layer as the above-described station 12. Thus, the access point 14 can basically perform the same operation as the station 12. As a result, the access point 14 can be regarded as the same as the station 12, if necessary.

The station 12 and/or the access point 14 which performs operation related to presence services with another station and/or access point in a wireless communication system, may comprise many kinds of means for performing a procedure related to presence services.

The operation related to presence services may be at least one of the fellowing connection operation or the fellowing presence operation. The procedure related to presence services may be at least one of the fellowing connection procedure or the presence fellowing procedure. The means for performing the procedure related to presence services may be implemented by software, hardware or their combination in the station 12 or the access point 14. The means performs all or part of steps which comprise the procedure related to the presence services.

The distribution system 16 is the backbone network that connects the plurality of access points 14. The distribution system 16 usually uses the Ethernet, but may connect the plurality of access points 14 in wireless. The distribution system 16 may broadly include a router or a switch connected to the Ethernet, and a plurality of servers connected to a wire and wireless internet network.

Referring to FIG. 1B, the wireless network system, for example, the wireless LAN system 10 includes the plurality of stations or terminals 12. The wireless LAN system 10 is connected to point-to-point directly between stations 12. Accordingly, the wireless LAN system 10 shown in FIG. 1B does not include a separate access point 14 and the distribution system 16, differently from the wireless LAN system 10 of FIG. 1A. However, the plurality of stations 12 in the wireless LAN system 10 can perform functions of the separate access point 14 and the distribution system 16. Also, a part of functions of the separate access point 14 and the distribution system 16 may be omitted.

Although the wireless LAN system 10 is explained with reference to FIGS. 1A and 1B, the wireless network system including the wireless LAN system 10 according to one embodiment of the present invention is not limited thereto, and may be implemented with their combination or a separate system. The wireless network system according to one embodiment of the present invention can exist independently, and interwork between a different wireless network system, a mobile communication network and a wire and wireless internet network.

For example, the wireless LAN system can provide a roaming service by interworking with a wideband code division multiple access (WCDMA). Specially, when the wireless LAN system provide a voice service, a dual band dual mode (DBDM) terminal supporting both the wireless LAN and the WCDMA performs voice call on the mobile communication network and simultaneously perform seamless automatic roaming on the wireless LAN system.

The wireless LAN systems 10 shown in FIGS. 1A and 1B can transmit data via a connection process between the stations 12 or between the station 12 and the access point 14.

Connection Procedure

Figure 2:
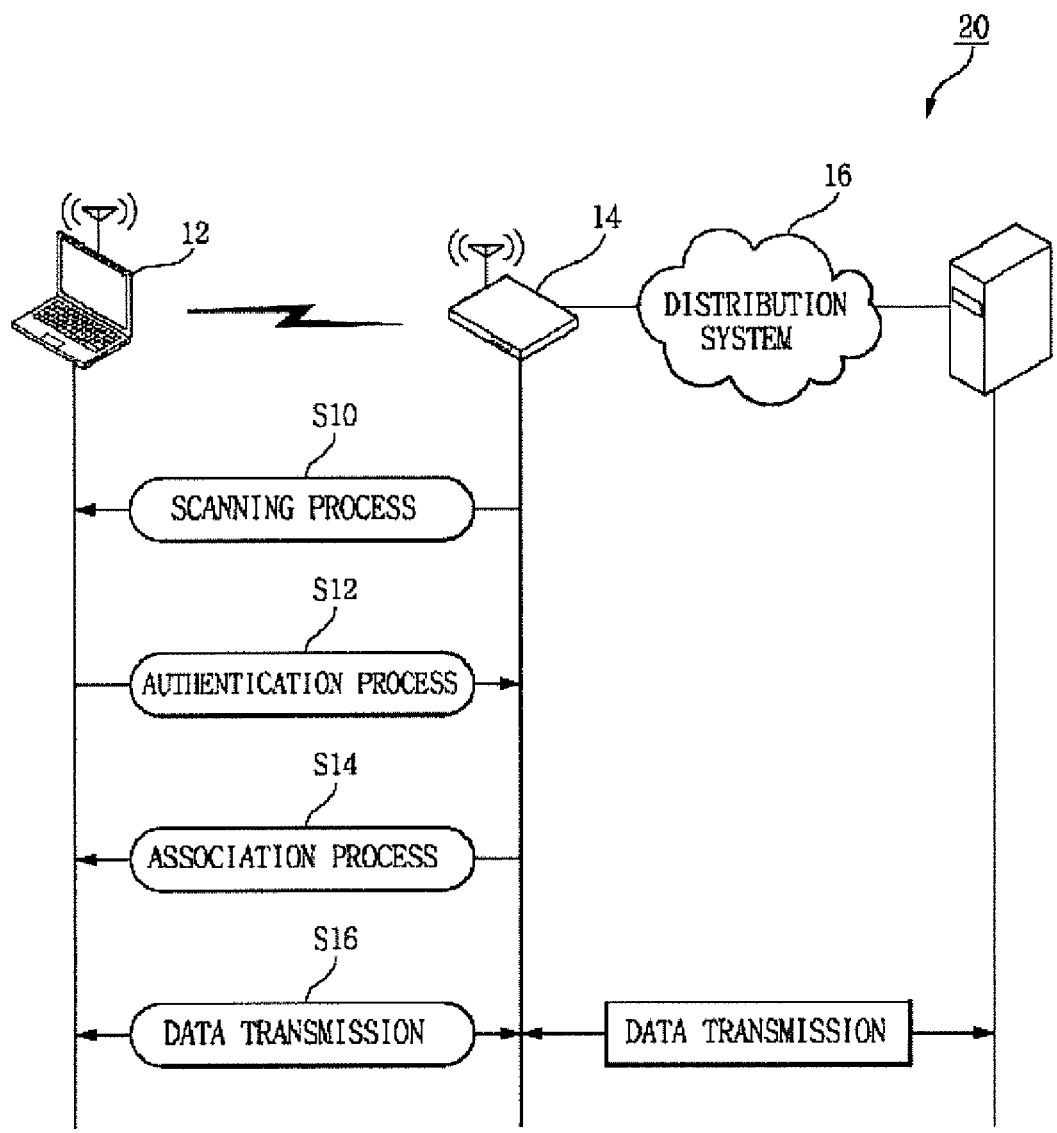
FIG. 2 is a procedure diagram illustrating a connection process for transmitting data in a wireless RAN system shown in FIG. 1A.

FIG. 2 is a procedure diagram illustrating a connection process for transmitting data in a wireless LAN system shown in FIG. 1A. The wireless LAN system and various wireless network system of FIG. 1B are partly different from those of FIG. 2. However, the wireless LAN system and various wireless network system of FIGS. 1B and 2 respectively include the connection process for transmitting the same data. Accordingly, the concrete explanation will be explained.

Referring to FIGS. 1A and 2, a connection process 20 for transmitting data between the station 12 and the access point 14 includes a scanning process S10, an authentication process S12, and a association process S14. The station 12 and the access point 14 perform a data transmitting process S16 via the processes S10, S12 and S14.

The scanning process S10 is the process to find out the peer access point 14 using either the beacon or the probe message.

The scanning process S10 includes a passive scanning process for searching for the access point 14 from the beacon message where the access point 14 periodically broadcasts, and a active scanning process for enabling the station 12 to broadcast a probe request message or frame according to each channel and receive a probe response message including one's own service set ID (SSID), an operation speed, and others, from the access point 14, so as to select the corresponding access point 14. The beacon message includes various capabilities (speed, encryption, etc.) capable of being supplied by the access point 14 and one's own service group name (i.e. SSID).

The authentication process S12 verifies that the station 12 selecting the proper access point 14 in the scanning process S10 is effective terminal. In other words, the authentication process S12 is to negotiate the access point 14, an authentication procedure, and an encryption method. Mostly, an open system authentication method is used in the authentication process S12. Accordingly, the access point 14 unconditionally authenticates an authentication request from the station. A reinforced authentication method includes EAP-TLS, EAP-TTLS, EAP-FAST, PEAP, and others.

The association process S14 is a process that the station 12 connects to the access point 14, after completing successfully the authentication. The association process S14 means that an identical association is established between the station 12 and the access point 14. If the association process S14 is completed, the station 12 can communicate with an other station 12 via the access point 14.

If the station 12 sends the association request message or frame to the access point 14, the association process S14 is performed by enabling the access point 14 to send an association response message including an association ID (AID) identified with other station.

The station 12 and the access point 14 perform a data transmitting process S16 via the processes S10, S12 and S14.

Reassociation

The association process S14 is similar to a reassociation process. The reassociation process is to connect the access point associated with the station 12 to other access point. The reassociation process is to establish a new connection with new access point 14, when a signal from the access point 14 associated with the station 12 becomes weaker.

In the reassociation, the frame which is stored to the old access point 14 is transferred from the new one 14 to the station 12. In detail, if the station 12 sends to the access point 14 a reassociation request message containing the address of the old access point 14 into the Current AP, the access point sends to the station 12 a reassociation response containing the Association ID (AID) which is a numerical identifier used to logically identify the station 12 to which buffered frames need to be delivered. The new access point 14 requests the IAPP (Inter-AP Protocol) to the old one 14 to send any buffered frames for the station 12.

The station 12 and the access point 14 comprise many kinds of means related to connection procedure. For example, The station 12 and the access point 14 comprises an authenticating means for performing an authentication procedure with another station. These means are implemented by software, hardware or their combination in the station 12 and the access point 14.

Presence Service During Association or Reassocation Procedure

The communicating method in a wireless network according to one embodiment, for example, the wireless LAN in FIGS. 1A and 1B, is that the station that supports presence capability sends the association request or the reassociation request frames containing its own location information and location capability.

The communicating method in a wireless network according to other embodiment is that the station that supports presence capability sends the association response or the reassociation response frames containing its own location information and location capability.

The station that supports presence capability is either the plurality of the stations 12 or the access point 14 which basically comprises the same physical layer and MAC sublayer as the station 12 in FIGS. 1A and 1B. In this specification, the station will be either the access point 14 or the station 12 in FIGS. 1A, 1B and 2.

In this communicating method, the presence parameters such as the table 1 and 2 are added to the association request and the reassociation request frames or messages as described in FIG. 2. The presence parameters such as the table 1 and 2 are also added to the association response and the reassociation response frames or messages as described in FIG. 2.

TABLE 1

| Order | Information | Notes |
|---|---|---|
| 10 | Wireless Network Management Capability | Wireless Network Management Capability is present if dot 11WirelessManagement Implemented is true. |
| 11 | Supported Regulatory Classes | Supported Regulatory Classes Capability is present if dot 11WirelessManagement Implemented is true. |
| 12 | Presence Parameters | The Presence Parameters element is present if dot 11WirelessManagement Implemented is true and the non-AP is capable of Presence Reporting. |

TABLE 2

| Order | Information | Notes |
|---|---|---|
| 12 | Wireless Network Management Capability | Wireless Network Management Capability is present if dot 11WirelessManagement Implemented is true. |
| 13 | FBMS Request | FBMS Request may be present if dot 11WirelessManagement Implemented is true and FBMS bit in the Wireless Network Management Capability is set to 1. |
| 14 | Supported Regulatory Classes | Supported Regulatory Classes Capability is present if dot 11WirelessManagement Implemented is true. |
| 15 | Presence Parameters | The Presence Parameters element is present if dot 11WirelessManagement Implemented is true and the non-AP is capable of Presence Reporting. |

In the table 1 and 2, the order of presence parameters is defined in free and may be changed thereto. Another information rather than presence parameters may be comprised or not into the association request (response) and the reassociation request (response) frames or messages.

Figure 3:
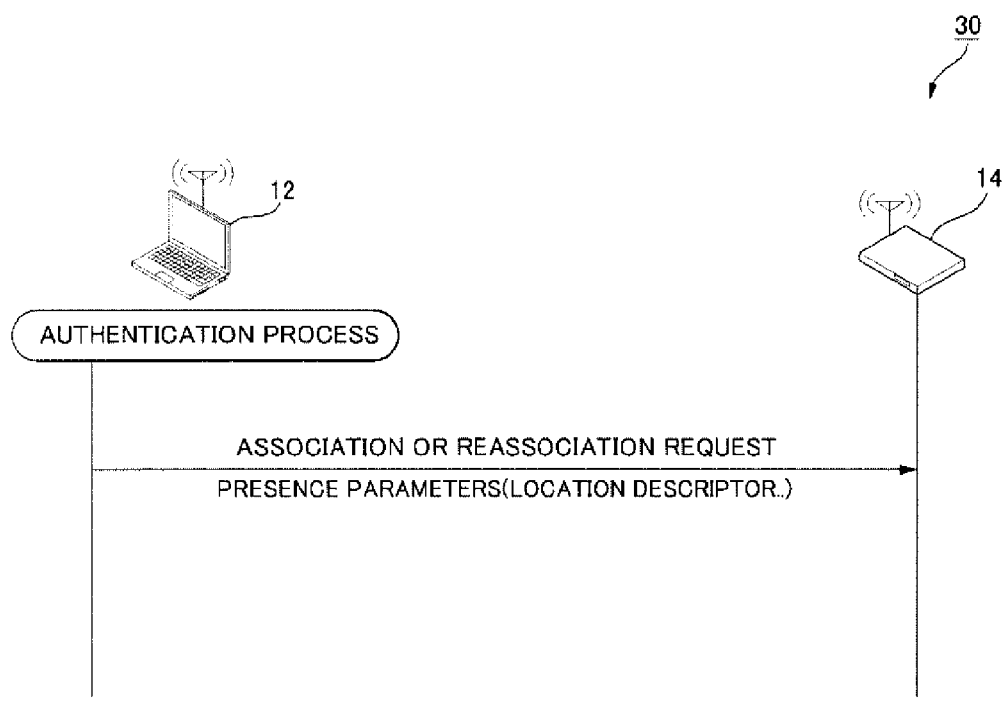
FIG. 3 is the flowchart of the communicating method according to one embodiment.

FIG. 3 is the flowchart of the communicating method according to one embodiment.

Referred to FIG. 3, the communicating method 30 in the wireless network according to one embodiment is that the presence parameters as follows are added into the association and/or reassociation request among frames transferred from the station 12 to the access point 14. The station 12 sends to the access point 14 the association and/or reassociation request with the presence parameters information element that includes a location descriptor to provide its own capability information related to its presence or location configuration. This may be regarded as one procedure included in the presence request procedure which is defined in IEEE 802.11v series for the WLAN.

According to the communicating method 30 in the wireless network, for example, the wireless LAN(WLAN), the station 12 may transfer its own presence capability related to its presence or its own location capability related to its location information, during the association request in the association procedure or the reassociation request in the reassociation procedure, with the presence request for presence service or the presence response in response to the presence request or before the access point 14 transfers to the station 12 presence capability of the station 12 related.

Therefore, the access point 14 can transfer to the station 12 any location information of the station 12 without request for presence information from the station 12. It makes the procedure for providing presence service simplify, thereby providing presence service rapidly.

On the contrary, the access point 14 also transfers its own presence capability related to its presence or location capability related to its location information. Therefore, the station 12 can foresee presence capability or location capability of the access point 12.

Figures 4, 5, 6:
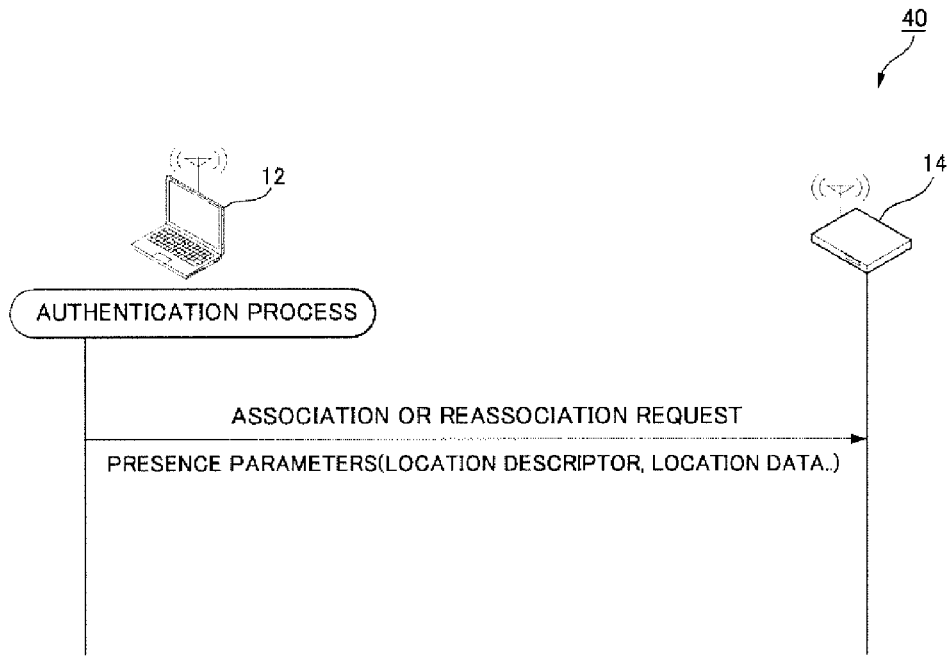
Figure 16:
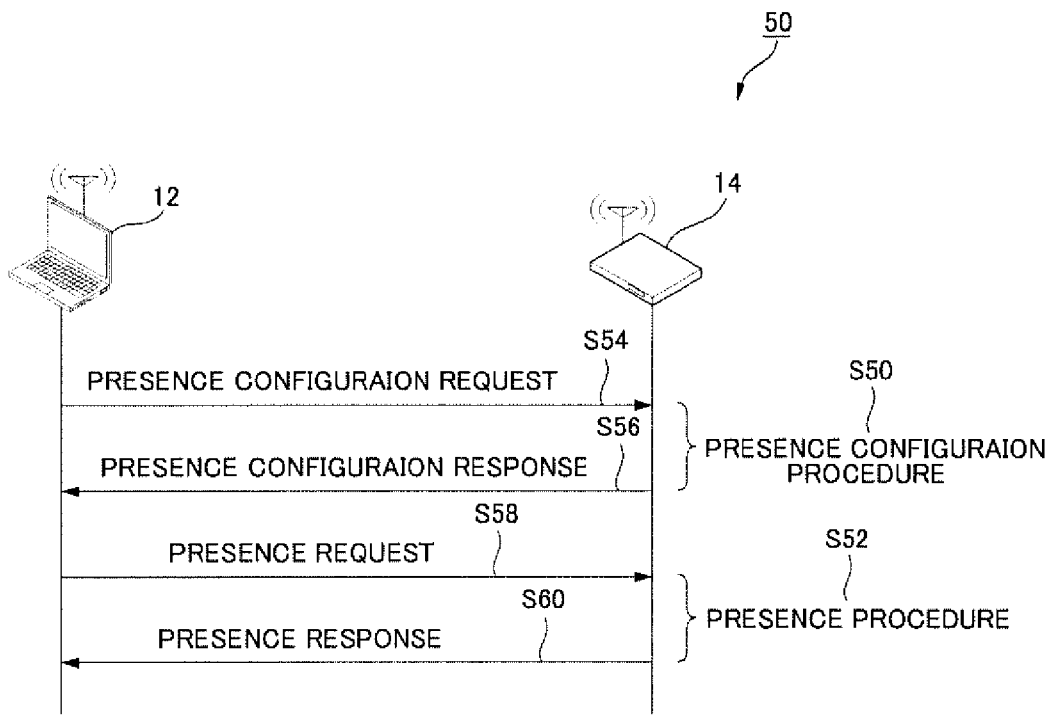
FIG. 16 is the flowchart of the communicating method according to another embodiment.

FIG. 4 is the flowchart of the communicating method according to the other embodiment.

Referring to FIG. 4, the communicating method 40 in the wireless network according to the other embodiment is that the presence parameters as follows are added into the association and/or reassociation request among frames transferred from the station 12 to the access point 14. The station 12 sends to the access point 14 the association and/or reassociation request with the presence parameters information element that includes a location data to provide its own location data. The location data contains its own location data that matches the format defined by the location descriptor.

This may be regarded as one procedure included in the presence request procedure or the presence advertising procedure which are defined in IEEE 802.11v series for the WLAN.

According to the communicating method 40 in the wireless network, for example, the WLAN, the station 12 can transfer to the access point 14 its own location data that the station 12 knows, during the association request in the association procedure or the reassociation request in the reassociation procedure, before the presence request or the presence configuration request.

Therefore, because the access point 14 foresee the location data of the station 12, the access point 14 provides the presence service that harmonizes with the station 12 and the station 12 receives the presence service that harmonizes with itself. It makes the procedure for providing presence service simplify to provide presence service rapidly.

It is variable for the station 12 to calculate or secure its own location data. For example, the station 12 may receive the calculated location from the access point 14 through the beacon or the probe response messages. Also, the station 12 may calculate its own location information from the location information of the access point 14 which is received from the access point 14. In other words, the station 12 may calculate its own location from the timing information that the access point 14 provides.

As another example, if the station 12 is equipped with the GPS receiver (Global Positioning System receiver), the station 12 may receive the signal from the GPS satellite and calculate its own location data from the received signal.

As another example, if the station 12 supports DBDM (Dual Band Dual Mode) for both WLAN and WCDMA or interworking WLAN in 3GPP and 3GPP2, the station 12 may receive its own location information or location data from the base station for the WCDMA.

On the contrary, the access point 14 can also transfer its own location data during the association or the reassociation. As a result, the station 12 can secure the location information of the access point 14. For example, the station 12 uses the secured location information from the access point 14 to calculate its own location data as described above.

The presence parameters information element is added in the association and the reassociation request and/or response. The presence parameters information element is used for presence and location services. The format of this information element comprises Element ID field, Length field and the Presence Sub-elements field which contains one or more Presence sub-elements described in table 3.

Therefore, the station 12 performs association operation with another station in a wireless communication system. In detail, the station 12 comprises an authenticating means for performing an authentication procedure with another station, a transmitting means for transmitting an association request comprising a plurality of information elements from one station to another station which is authenticated with one station, wherein the plurality of information elements comprise Presence Parameters information and a receiving means for receiving an association response comprising a plurality of information elements comprising association ID assigned to one station from another station.

Also, the station 12 performs reassociation operation from one station to another station in a wireless communication system. In detail, the station 12 comprises an authenticating means for performing an authentication procedure with another station, a transmitting means for transmitting an reassociation request comprising a plurality of information elements from the station to another station which is authenticated with the station, wherein the plurality of information elements comprise Presence Parameters information and a receiving means for receiving an reassociation response comprising a plurality of information elements comprising association ID assigned to the station from another station.

In another aspect, the access point 14 performs association operation for an access point in a wireless communication system. In detail, the access point 14 comprises an authenticating means for performing an authentication procedure with a station, a receiving means for receiving an association request comprising a plurality of information elements from the station which is authenticated with the access point, wherein the plurality of information elements comprise Presence Parameters information and a transmitting means for transmitting an association response comprising a plurality of information elements comprising association ID assigned to the station to the station.

Also, the access point 14 performs reassociation operation for an access point from another access point in a wireless communication system. In detail, the access point 14 comprises the authenticating means for performing an authentication procedure with a station, the receiving means for receiving an reassociation request comprising a plurality of information elements from the station which is authenticated with the access point, wherein the plurality of information elements comprise Presence Parameters information and the transmitting means for transmitting an reassociation response comprising a plurality of information elements comprising association ID assigned to the station to the station.

TABLE 3

| Identifier | Field Name |
|---|---|
| 1 | Presence Indication Parameters |
| 2 | Presence Indication Channels |
| 3 | Presence Request Options |
| 4 | Presence Status |
| 5 | Location Service Parameters |
| 6 | Radio Information |
| 7 | Timing Measurements |
| 8 | Motion |
| 9 | Location Descriptor |
| 10 | Location Data |
| 11 | Location ID |
| 12-254 | Reserved |
| 255 | Vendor Specific |

The presence subelements of table 3 in the presence parameters information element that is included in the association and the reassociation requests is described below.

1. Presence Indication Parameters Field

The Presence Indication Parameters sub-element contains station's presence reporting characteristics. The format of the Presence Indication Parameters sub-element is shown in FIG. 5.

The Normal Report Interval is the time interval, expressed in the units indicated in the Report Interval Units field at which the station 12 or the access point 14 reports or is expected to report its presence by sending Presence Request frame. The Normal Number of Frames per Channel is the number of Presence Request frames per channel sent or expected to be sent by the station 12 or the access point 14 at each Normal Report Interval.

The In-Motion Report Interval is the time interval, expressed in the units indicated in the Report Interval Units field at which the station 12 or the access point 14 reports or is expected to report its presence by sending a Presence Request frame when the station 12 or the access point 14 is in motion. If motion detection is not supported, this field is set to 0. The definition of motion and the means to determine motion are outside the scope of this standard. The In-Motion Number of Frames per Channel is the number of Presence Report frames per channel sent or expected to be sent by the station 12 or the access point 14 at each In-Motion Report Interval. If motion detection is not supported, this field is set to 0.

The Inter-frame Interval is the time interval, expressed in milliseconds between the transmissions of each of the Normal or In-Motion frames per channel.

2. Presence Indication Channels Field

The Presence Indication Channels sub-element contains presence reporting channel information. The format of the Presence Indication Channels sub-element format is shown in FIG. 6.

3. Presence Request Options

The Presence Request Options sub-element indicates the sub-elements that are to be included in the subsequent Presence Response frame. The format of the Presence Request Options sub-element is shown in FIG. 7.

The options field is a bit-field used to identify the desired Presence Parameter sub-elements to be included in a subsequent Presence Response frame. A value of 1 for a given bit indicates that the sub-element is to be included and a value of 0 indicates that the sub-element needs not be included. All reserved values are set to 0. Table 4 shows the available options.

TABLE 4

| Bit | Included Field |
|---|---|
| 0 | Timing Measurements |
| 1 | Radio Information |
| 2 | Motion |
| 3-15 | Reserved |

4. Presence Status Field

The Presence Status sub-element provides the result of a Presence Request or Presence Configuration Request frame. The format of the Presence Status sub-element is shown in FIG. 8.

The Status field identifies the result of the Presence Request frame and is one of the values in Table 5.

TABLE 5

| Status Value | Description |
|---|---|
| 0 | Success |
| 1 | Fail |
| 2 | Refuse |
| 3 | Incapable |
| 4-255 | Reserved |

5. Location Service Parameters

The Location Service Parameters sub-element describes the capabilities the access point(14, AP STA) provides to the station(12, non-AP STA). The format of the Location Service Parameters sub-element is shown in FIG. 9.

The Location Service State field defines whether the station 12 or the access point 14 is requesting location services to start or end. The values are defined in Table 6. The Location Service Interval field is the time interval, expressed in seconds, at which the station 12 or the access point 14 requests to receive location data.

TABLE 6

| State Value | Description |
|---|---|
| 0 | Stop |
| 1 | Start |

6. Radio Information Field

The Radio Information sub-element contains radio information. The format of the Radio Information subelement is shown in FIG. 10.

The transmit Power field is the transmit power of the radio transmitting the Presence Request frame and is a signed integer, one octet in length, reported in dBm. A value of −127 indicates that the transmit power is unknown.

The Antenna ID field is the identifying number for the antenna used to transmit the Presence Request frame.

The antenna gain field is the antenna gain of the antenna over which the Presence Request frame is transmitted and is a signed integer, one octet in length reported in dBi. A value of −127 indicates that the antenna gain is unknown.

The received RSNI field contains the RSNI value (dBm) measured against the most recently received Presence Request or Response. A value of −127 indicates that the RSNI value is unknown or is not used.

The RCPI field contains the RCPI value measured against the most recently received Presence Request or Response. A value of −127 indicates that the RCPI value is unknown or is not used.

7. Timing Measurement Field

The Timing Measurements sub-element contains timing information. The format of the Timing Measurements sub-element is shown in FIG. 11.

The Timestamp Difference Units field contains the units for the timestamp difference field, as indicated in Table 7.

TABLE 7

| Timing Difference Units | Description |
| --- | --- |
| 0 | Microseconds |
| 1 | Hundreds of Nanoseconds |
| 2 | Tens of Nanoseconds |
| 3 | Nanoseconds |
| 4 | Tenths of Nanoseconds |
| 5-255 | Reserved |

8. Motion Field

The Motion sub-element contains motion information. The format of the Motion sub-element is shown in FIG. 12.

The motion indicator field is defined in Table 8.

TABLE 8

| Motion Indicator Value | Description |
| --- | --- |
| 0 | Stationary |
| 1 | Start of motion |
| 2 | In motion |
| 3 | End of motion |
| 4 | Unknown |
| 5-255 | Reserved |

9. Location Descriptor Field

The Location Descriptor sub-element describes the content of the Location Data element for the location capability either being requested or received by the station 12 or the access point 14. The format of the Location Descriptor sub-element is shown in FIG. 13.

Location Descriptor (bits 4-7) or Location Resolution Descriptor among the Location Descriptor field as described in FIG. 13 is used for indicating location capability of the station 12 or the access point 14.

For one example, the value of Location Descriptor (bits 4-7) is indicated in Table 9.

TABLE 9

| Format | Description |
| --- | --- |
| 0 | CIVIC |
| 1 | GEO |
| 2 | Vendor Specific |
| 3-15 | Reserved |

Bits 4-7 of the Location Descriptor field indicate the format of the Location Data requested or sent in a Presence response frame, as indicated in Table 9.

"GEO" (Geospatial coordinates) indicate longitude, latitude, and altitude, while "CIVIC" (civic addresses) indicate a street address. The civic address is commonly, but not necessarily, closely related to the postal address, used by the local postal service to deliver mail. However, not all postal addresses correspond to street addresses.

GEO and CIVIC formats and usage rules are defined in IETF RFC 4119. Usage rules for the receiver of the location information are defined by RFC 4119 and RFC 3693.

For other example, the value of Location Descriptor (bits 4-7) is indicated in Table 10.

TABLE 10

| Format | Description |
| --- | --- |
| 0 | CIVIC |
| 1 | GEO |
| 2 | CIVIC and GEO |
| 3 | Vendor Specific |
| 4-15 | Reserved |

"GEO" and "CIVIC" formats in Table 10 are equal to what is explained in Table 9. The location description value of "CIVC and GEO" format indicates that the station 12 or the access point 14 is capable of supporting both "CIVIC" and "GEO" formats.

For another example, the value of Location Descriptor (bits 4-7) is indicated in Table 11.

TABLE 11

| Format | Description |
| --- | --- |
| 0 | CIVIC |
| 1 | GEO |
| 2 | CIVIC Preferred |
| 3 | GEO Preferred |
| 4 | Not Supported |
| 5 | Vendor Specific |
| 6-15 | Reserved |

"GEO" and "CIVIC" formats in Table 11 are equal to what is explained in Table 9. The location description value of "CIVIC Preferred" and GEO Preferred" formats indicates that the station 12 or the access point 14 is capable of supporting both "CIVIC" and "GEO" formats, but prefers the indicated format. The location description value of "Not supported" format indicates that the station 12 or the access point 14 is capable of supporting neither "CIVIC" nor "GEO" format.

What add "CIVIC Preferred" and "GEO Preferred" to the location descriptor field provides several kinds of location services for the station 12 or the access point 14 so as to increase the quality of presence service.

Therefore, the station 12 performs presence operation in a wireless communication system. The station comprises a transmitting means for transmitting data to another station in the wireless communication system, wherein the data comprises presence parameters information which comprises location descriptor information supporting for both geographic coordinates value ('GEO') and civic location value ('CIVIC') and a performing means for performing presence operation in a wireless communication system.

In another aspect, the access point 14 performs presence operation for an access point in a wireless communication system. The access point 14 comprises a receiving means for receiving data to a station in the wireless communication system, wherein the data comprises presence parameters information which comprises location descriptor information supporting for both geographic coordinates value ('GEO') and civic location value ('CIVIC') and a receiving means for performing presence operation in a wireless communication system. The means for performing the procedure related to presence services may be implemented by software, hardware or their combination in the access point 14.

Also, the location descriptor information can indicate the preference between the GEO and the CIVIC for the formation of the location data.

The location descriptor included in the presence parameters information element of the association (or reassociation) request or response message (frame) is not limited to table 9 to 11, but can be variable. For example, the location descriptor may define only one of "GEO" and "CIVIC".

The Location Resolution Descriptor field has two subfields that indicate the location resolution (0-3 Bits) and the accuracy (4 Bits) being requested or sent in a response, as indicated in Table 12 and Table 13. Bits 5-7 are reserved bits.

TABLE 12

| Resolution | Description |
|---|---|
| 0 | Highest possible |
| 1 | Building resolution |
| 2 | AP resolution |
| 3 | XY resolution |
| 4-15 | Reserved |

TABLE 13

| Accuracy | Description |
|---|---|
| 0 | No accuracy estimate |
| 1 | Include accuracy estimate |

The Encoding Descriptor field indicates the Location Data encoding, as indicated in Table 14.

TABLE 14

| Encoding Value | Description |
|---|---|
| 0 | LCI |
| 1 | Text |
| 2 | ASN, 1 |
| 3-255 | Reserved |

The value of 0 indicates that the location data object is defined by the binary format described in RFC 3825. The value of 1 indicates that the location data object is defined in plain-text XML as defined by the schema in RFC 4119. A value of 2 indicates that the location data object is defined in an ASN.1 encoding, per X.694.

10. Location Data Field

The Location Data sub-element provides the requested location data. The format of the Location data subelement is shown in FIG. 14.

The Element ID field contains the value 10, and the value of the Length field is variable.

The Location Accuracy Estimate is an estimated accuracy in 0.1 meter increments, defined by a little endian 16 bit unsigned integer. For example, an accuracy estimate of +/−5 meters is presented by the number 0x32 (decimal 50). If the location accuracy estimate is unknown, the field is set to 0. The Location Value field contains the location data that matches the format defined by the Location Format Descriptor.

To indicate whether the location data in the location data field is defined with some accuracy or format, or when the location data in the location data field is measured, the above-described location descriptor field or location source identifier may be uses.

11. Location ID Field or Location Source Identifier Field

The Location Source Identifier sub-element provides the Location Source Identifier. The format of the subelement is shown in FIG. 15.

The Time zone Offset field is the Coordinated Universal Time (UTC) offset that the location timestamp is specified with respect to. The default Time zone Offset value is 0 (UTC). The Location timestamp field is the time that the location value was determined, in UTC, including hours, minutes, seconds and milliseconds, as shown in Table 15.

TABLE 15

| Octet | Description |
|---|---|
| 0-2 | Milliseconds (0-999) |
| 3 | Seconds (0-59) |
| 4 | Minutes (0-59) |
| 5 | Hours (0-23) |

The station 12 or the access point 14 that is incapable of providing time sets the Time zone and Timestamp field to 0. The Public Identifier Link field is a string value, provided to comply with RFC 3693. The Public Identifier Link confirms the validity of the location estimate to an external agent when a station 12 or the access point 14 forwards a location estimate to that agent. The protocol used to query the infrastructure for a location report based on the Public Identifier Link is beyond the scope of this standard.

The above described communicating method in the wireless network provides the presence information, for example, the presence parameters information element in the association or reassociation procedure, which is regarded as one procedure in the presence request procedure and the presence advertising Procedure as defined in IEEE 802.11v for wireless LAN.

Presence Procedure

Referring to FIG. 6, the presence procedure 50 comprises the presence configuration procedure S50 and the presence procedure S52. The former S50 comprises the presence configuration request procedure S54 and procedure S56. The latter S52 comprises the presence request procedure S58 and the presence response procedures S60.

Of course, the station 12 and the access point 14 comprise many kinds of means related to presence procedure. These means are implemented by software, hardware or their combination in the station 12 and the access point 14.

This presence procedure provides the presence service such as the kind of the wireless communication between the station 12 and the access point 14 in FIGS. 1A and 1B (for example, instant messenger, cellular phone, email), the will for communication (for example, emergency call, empty, other working, etc.), the capability or the feature during communication (for example, voice mail, video call, mobile or stationary, language).

1. Presence Configuration Procedure

To support the presence service there are two primary operations that may be configured between the station 12 or the access point 14. The first configuration operation required is for the periodic exchange of frames for the purpose of collecting the necessary data to make a location determination. The second configuration operation is for establishing a location service that periodically provides location estimation to the station 12 or the access point 14.

The station 12 or the access point 14 may configure the presence service by either including a Presence Parameters information element in a Beacon or Probe Request (or response) frame, or by including a Presence Parameters information element in a Presence Configuration Request (or response) frame.

That is, the station 12 or the access point 14 may configure the presence service by either including a Presence Parameters information element in a Beacon or Probe Request (or response) frame, so that the beacon or probe request (or response) frame performs the same function as the Presence Configuration Request (or response) frame as described below.

1) Presence Configuration Request

The Presence Configuration Request frame may be a broadcast or unicast frame. The station 12 or the access point 14 receiving a unicast Presence Configuration Request frame shall respond with Presence Configuration Response frame that includes a Presence Parameters information element indicating the result of the request in the Presence Status sub-element. The station 12 or the access point 14 receiving a broadcast Presence Configuration Request frame shall not send a Presence Configuration Response frame.

The station 12 or the access point 14 wishing to configure another peer station 12 or the access point 14 to periodically transmit Presence Response frames for the purpose providing location data may do so by sending a Presence Parameters information element to the peer in a Beacon, Probe Response or Presence Configuration Request frame. The Presence Parameters information element may contain a Location Service Information sub-element describing the desired behavior such as Presence Indication Parameters in FIG. 5 and Presence Indication Channels field in FIG. 6.

This Presence Parameters information element may contain a Location Service Information sub-element describing the desired behavior as described in FIG. 9 and table 6. Or This Presence Parameters information element may contain Presence Request Options or Vendor Specific Information as described in FIG. 7 and table 4.

If the frame used to initiate service is a unicast Presence Configuration Request frame then the peer STA shall respond with a Presence Configuration Request frame that includes a Presence Status sub-element indicating whether the request is successful or not.

The Presence Status sub-element has four possible status values: Success, Fail, Refuse and Incapable. When a STA receives a Configuration Response frame with Presence Status indicating anything other than Success, the STA shall assume the original request was not processed and the STA should take appropriate action based on the status value returned. For Presence Status Fail, the STA may either retry the original request or send an alternate request. For Presence Status Incapable, the STA shall not send another configuration request matching the previous configuration request while associated to the same BSS.

The requesting station may use the State field in the Location Service Information sub-element in FIG. 9 and table 6 to start or stop the service.

The station 12 or the access point 14 that supports presence capability may send an Presence Configuration Request frame to provide its own location information and location capability.

The station 12 or the access point 14 shall include a Location Descriptor field in an Presence Configuration Request frame to provide its location capability. The location description value of 2 "CIVIC Preferred" or 3 "GEO Preferred" indicates that the station is capable of supporting both CIVIC and GEO formats, but prefers the indicated format. The station shall indicate the location resolution it can support with location resolution descriptor element.

Figure 19:
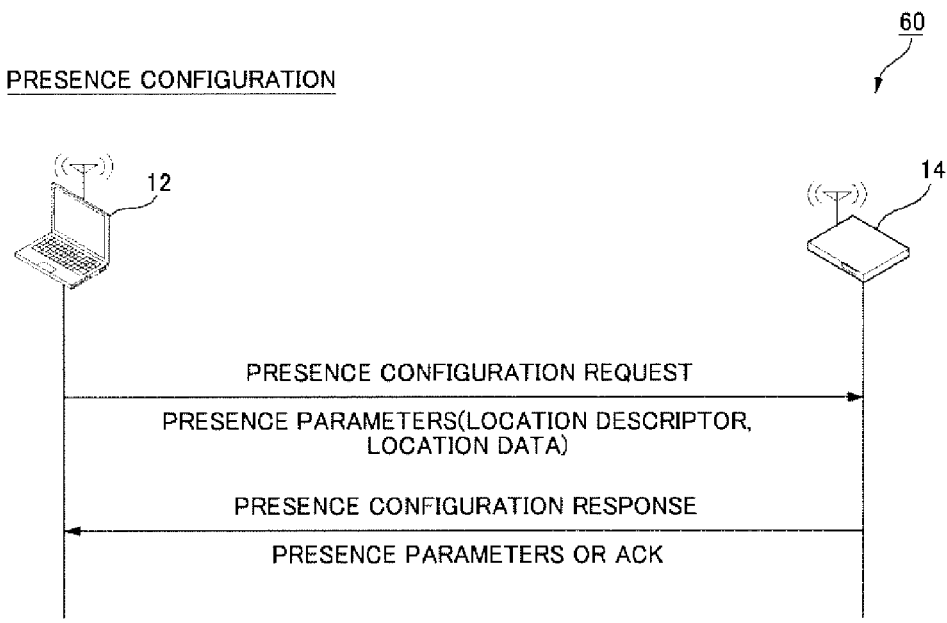
FIG. 19 is the flowchart of the communicating method for the presence configuration request frame according to another embodiment.

Referring to FIG. 19, the receiving station 12 or the access point 14 can send the presence configuration response including ACK message in response to the presence configuration request after receiving the presence configuration request.

Figures 20, 21, 22, 23:
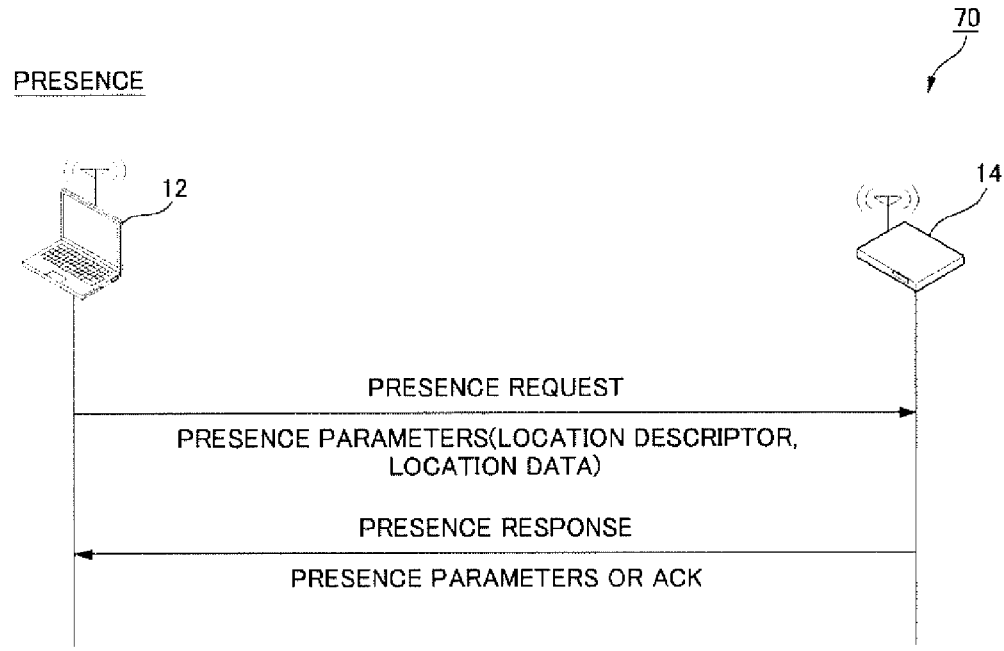
FIG. 20 shows the format of the presence configuration request frame of FIG. 19.
FIG. 21 shows the format of the presence configuration response frame of FIG. 19.
FIG. 22 shows the format of the presence configuration response frame of FIG. 19.
FIG. 23 is the flowchart of the communicating method for the presence request and response frames according to another embodiment.

The format of the Presence Configuration Request frame body is shown in FIG. 20.

The Category field is set to the value indicating the Wireless Network Management category. The Action field is set to the value indicating Presence Configuration Request. The Dialog Token field is a nonzero value which identifies the Presence Configuration Request/Response transaction. The dialog token is unique for each Presence Configuration Request frame sent to a given destination MAC address.

The Presence Parameters Element field contains the presence parameters sub-elements.

The allowed Presence Parameters sub-elements for a Presence Parameters element that is included in the Presence Configuration Request frame are Presence Indication Parameters in FIG. 5, Presence Indication Channels field in FIG. 6, Presence Request Options in FIG. 7 and table 4, Location Descriptor field in FIG. 13 and table 10 to 14, Location Data field in FIG. 14, Location ID, FIG. 15, and Vendor Specific Information.

2) Presence Configuration Response

The Presence Configuration Response frame uses the Action frame body format and is transmitted by a station 12 or the access point 14 in response to the receipt of a Presence Configuration Request frame. The format of the Presence Configuration Response frame body is shown in FIG. 21.

The Category field is set to the value indicating the Wireless Network Management category. The Action field is set to the value indicating Presence Configuration Response. The Dialog Token field is set to the nonzero value received in the Presence Configuration Request frame to identify the request/response transaction. The Presence Parameters Element field contains the presence parameters sub-elements.

The allowed Presence Parameters sub-elements for a Presence Parameters element that is included in the Presence Configuration Response frame are Presence Indication Parameters in FIG. 5, Presence Indication Channels in FIG. 6, Presence Status in FIG. 8 and table 5, Location Descriptor field in FIG. 13 and table 10 to 14, Location Data field in FIG. 14, Location ID in FIG. 15, and Vendor Specific Information.

The allowed Presence Parameters sub-elements for a Presence Parameters element that is included in the Presence Configuration Request frame and the Presence Configuration Response frame include many kinds of location descriptor so that the station 12 or the access point 14 may provide its own presence capability for other station 12 or the access point 14.

Also, the allowed Presence Parameters sub-elements for a Presence Parameters element that is included in the Presence Configuration Request frame and the Presence Configuration Response frame include many kinds of location data so that the station 12 or the access point 14 may provide its own location information for other station 12 or the access point 14.

Of course, before the station 12 transmits the presence configuration request to another station, the station 12 constructs the presence configuration request containing a presence parameters information element, wherein the presence parameters information element comprises a location descriptor to provide its own location capability and a location data to provide its own location information if the station 12 is capable of calculating its own location. Also, after the station 12 transmits the presence configuration request to another station, the station 12 reports the result of the presence configuration request.

In view of the station 12's configuration, the station 12 comprises a constructing means for constructing a presence configuration request, a transmitting means for transmitting the presence configuration request to another station and a reporting means for reporting the result of the presence configuration request.

On the contrary, after the access point 14 receives from the station 12 a presence configuration request, the access point 14 processes presence action on basis of the presence configuration request and transmits the presence configuration response if there is a request that the presence configuration response be sent to the station 12, in response to the received presence configuration request. Finally, the access point reports the result of the presence response In view of the access point 14's configuration, the access point 14 comprises a receiving means for receiving from a station a presence configuration request, a processing means for processing presence action, a transmitting means for transmitting a presence configuration response and a reporting means for reporting the result of the presence response.

As a result, the station 12 or the access point 14 may provide its own presence capability or location information for other station 12 or the access point 14 in the step configuring the presence service before the presence procedure, which can simplify the next presence procedure. To provide its own location in advance has the effect to minimize or control the load of the station 12 or the access point 14 in the next presence procedure. Therefore, the user for the station 12 or the access point 14 gets the presence service quickly if needed.

To maintain the previous fields in the Presence Configuration Request frame and the Presence Configuration Response frame except for including the location descriptor field or the location data field keeps the Presence Configuration Request frame and the Presence Configuration Response frame and its own presence capability and location data in advance.

Of course, the receiving station 12 or the access point 14 can send the presence configuration response including ACK message in response to the presence configuration request after receiving the presence configuration request.

2. Presence Procedure

Figure 17:
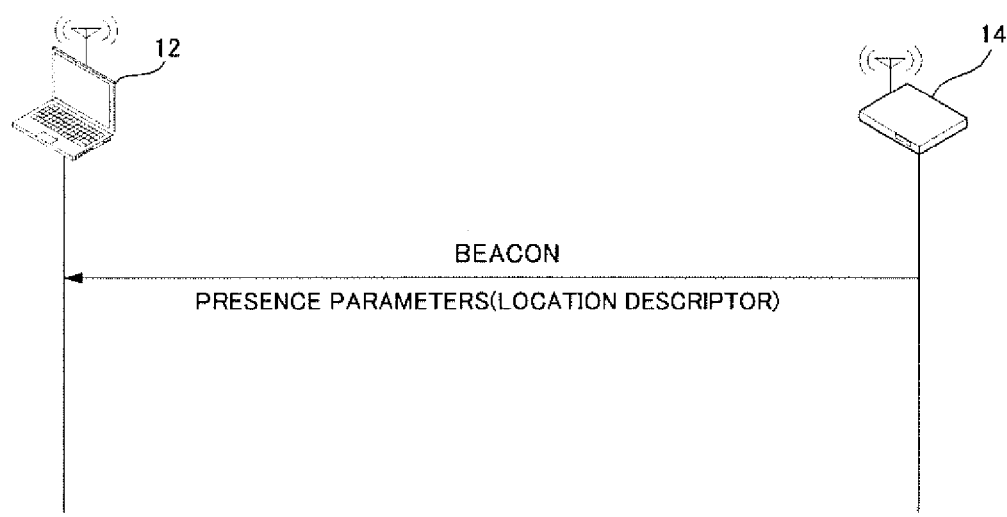
FIG. 17 is the flowchart of the communicating method for the beacon frame according to another embodiment.
Figure 18:
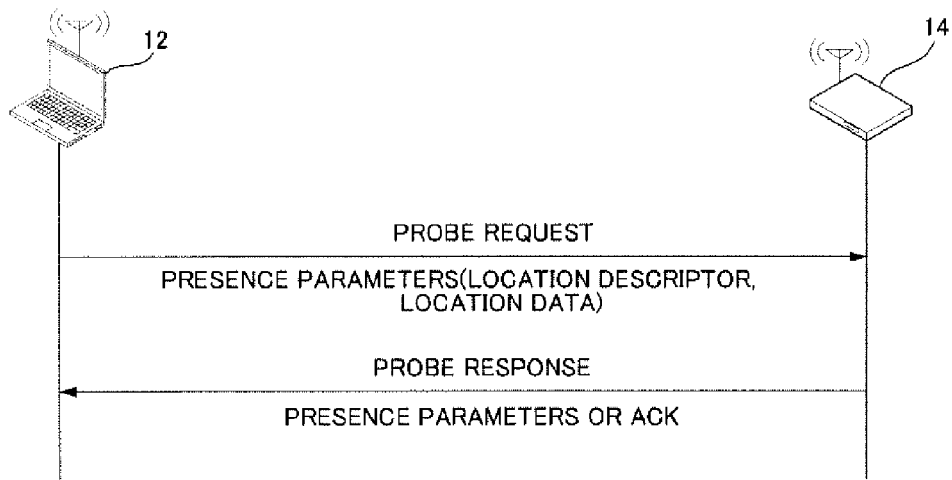
FIG. 18 is the flowchart of the communicating method for the probe request or the probe response frames according to another embodiment.

Referring to FIGS. 17 and 18, the beacon, the probe request or the probe response in the wireless network such as the wireless LAN in FIG. 1A may include the allowed Presence Parameters sub-elements for Presence Parameters Information Element to perform the same presence procedure as the presence request or response.

For example, when the station 12 or the access point 14 moves from one ESS (Extended Service Set) to other ESS, the station 12 or the access point 14, the station 12 or the access point 14 can add the above-described presence parameters information sub-element for presence parameters information element including at least either location descriptor or location data to the beacon, the probe request or the probe response, so that the station 12 or the access point 14 can provide the location capability or the location information before the presence procedure. The ESS (Extended Service Set) means a set of one or more interconnected basic service sets (BSSs) and integrated local area networks (LANs) that appears as a single BSS to the logical link control layer at any station associated with one of those BSSs, as defined in IEEE 802.11.

1) Presence Request

The Presence Request frame uses the Action frame body format and is transmitted by the station 12 or the access point 14 to advertise its presence or request its own location information from a peer station 12 or the access point 14 that supports location services.

The station 12 or the access point 14 may periodically advertise its presence by sending Presence Request frames. The Presence Request frame may be a broadcast or unicast frame. A Presence Request frame may be sent by the station 12 when the station 12 is not associated to the access point 14. In a BSS, a Presence Request frame may be sent to the access point 14 (when sent unicast) or can be sent to other access points (when sent as a broadcast frame).

In the wireless network such as the wireless LAN(BSS) in FIG. 1A. a Presence Request frame may be sent to the access point 14 (when sent unicast) or can be sent to other access points (when sent as a broadcast frame). In the wireless network such as the wireless LAN(IBSS) in FIG. 1B. a Presence Request frame may not be sent.

The station 12 or the access point 14 in a BSS may send Presence Request frames as indicated in the Beacon or Probe Response frame Presence Parameters information element. When the station 12 or the access point 14 moves from one ESS to another ESS, the station 12 or the access point 14 may send Presence Request frames as indicated in the Beacon or Probe Response frames of the new ESS.

The station 12 may request its own location information from the peer station 12 or access point 14 that supports location services. To request the location, the station 12 shall send a Presence Request frame with a Presence Parameters information element that includes a Location Descriptor. The Location Descriptor in the request shall specify "Local".

The station 12 shall specify the Format Descriptor, Resolution Descriptor, and Encoding Descriptor of the Location Data and Encoding Descriptor received in the Presence Response frame. The station 12 may define the Vendor Specific Information.

The Presence Parameters Element field contains the Presence Parameters sub-elements. The allowed Presence Parameters sub-elements for a Presence Parameters element that is included in the Presence Response frame include Radio Information in FIG. 10, Motion in FIG. 12, Presence Request Options in FIG. 7 and table 4, and Vendor Specific Information along with the above-described location descriptor.

The station 12 or the access point 14 may request the Remote location information from the peer station 12 or the access point 14 that supports location services. To request the location, the station 12 or the access point 14 shall send a Presence Request frame with a Presence Parameters information element that includes a Location Descriptor sub-element in the request frame. The Location Descriptor in the request shall specify "Remote".

The station 12 or the access point 14 shall specify the Format Descriptor, Resolution Descriptor and Encoding Descriptor of the Location Data. The station 12 or the access point 14 may define the Vendor Descriptor.

The station 12 or the access point 14 that supports presence capability may send a Presence Request frame to provide data for the purpose of locating the station 12 or the access point 14. The station 12 or the access point 14 shall send a Presence Request frame on the requested channels and at the requested interval as defined by the requesting Presence Parameters information element in the Beacon, Probe Response or Presence Configuration Request frame.

The station 12 or the access point 14 shall include a Radio Information and Motion sub-element as requested by the Presence Request Options sub-element in the corresponding requesting Presence Parameters information element. The station 12 or the access point 14 sending the Presence Request frame may also include a Presence Request Options sub-element to indicate whether a Radio Information sub-element, Timing Measurements or Motion sub-element is required in the corresponding Presence Response frame. If no Presence Request Options sub-element is included then no Presence Response frame shall be sent.

The station 12 or the access point 14 may include the Radio Information field values in the Presence Request frame, to provide radio related information to the receiving station. The Radio Information can be used to support location services.

The station 12 or the access point 14 may include the Motion field values in the Presence Request frame, to provide motion related information to the receiving station. The Motion Information can be used to support location services.

The station 12 or the access point 14 that supports location services and receives a Presence Request frame which includes a Presence Request Options sub-element with the Radio Information bit set to "1" shall respond with a Presence Response frame that includes a Radio Information sub-element containing available radio information field values.

The station 12 or the access point 14 that supports location services and receives a Presence Request frame which includes a Presence Request Options sub-element with the Motion bit set to "1" shall respond with a Presence Response frame that includes a Motion sub-element containing the applicable Motion Indicator field value.

The station 12 or the access point 14 that supports location services and receives a Presence Request frame which includes a Presence Request Options sub-element with the Timing Measurements bit set to "1" shall respond with a Presence Response frame that includes a Timing Measurements sub-element containing the time difference between the time that the Presence Request frame was received from the peer station and the time that the corresponding ACK frame was sent to the peer station.

The station 12 or the access point 14 that supports the presence capability may send an Association Request, Reassociation Request or Presence Request frame to provide its own location information and location capability. The station 12 or the access point 14 shall include a Location Descriptor sub-element in the Presence Parameters information element in an Association Request, Reassociation Request or Presence Request frame to provide its location capability.

The location description value of 2 "CIVIC Preferred" or 3 "GEO Preferred" indicates that the station 12 or the access point 14 is capable of supporting both CIVIC and GEO formats, but prefers the indicated format. If the station 12 or the access point 14 is capable of calculating its own location and wishes to provide its location to the access point 14, then the station 12 may include a Location Data sub-element in the Presence Parameters information element.

2) Presence Response

The Presence Response frame is sent in response to a received Presence Request frame, and provides presence reporting parameters to the station 12 or the access point 14. The Presence Response frame shall be sent by the station 12 or the access point 14 in response to a received Presence Request frame in which the Response Requested bit is set to 1. The Presence Response frame, Beacon and Probe response frames provide presence reporting parameters to the station 12 or the access point 14.

The Presence Response frame may be sent for several purposes, including providing location information to a peer station 12 or exchanging frames for location calculation purposes.

The station 12 or the access point 14 that supports the presence capability and receives a Presence Request frame that includes a Presence Request Options sub-element shall respond with Presence Response frame that includes the requested sub-elements in the Presence Request Options sub-element and a Presence Status sub-element indicating the result of the request.

The station 12 or the access point 14 that supports location services and receives a Presence Parameters information element that includes a Location Service Parameters sub-element or a Presence Request frame that includes a Data Description sub-element shall respond with Presence Response frames that include a Location Descriptor and a Location Data sub-element.

Depending on the options defined in the Location Descriptor of the request, the station 12 or the access point 14 may also include the Location Source Identifier sub-element in the response. Location Subject shall be set to Local or Remote in the Location Descriptor depending on the requested location. The station 12 or the access point 14 shell set the Format, Resolution and Encoding descriptors in the Location Descriptor to match the Location Data sub-element content. If the responding station 12 or the access point 14 is not able to respond with values that match the request as defined in the Location Description sub-element, the station shall send a response with a Presence Status element that indicates "Failed".

The Presence Response frame uses the Action frame body format and is transmitted by the station 12 or the access point 14 in response to the receipt of a Presence Request frame. The format of the Presence Response frame body is shown in FIG. 22.

The Category field is set to the value indicating the Wireless Network Management category. The Action field is set to the value indicating Presence Response. The Dialog Token field is set to the "nonzero" value received in the Presence Request frame to identify the request/response transaction.

The Management Action Pending field is set to 0 if no management action is pending for the destination station, and set to 1 if there is a management action pending for the destination station. A value of 255 in the management action pending field indicates that the STA stop sending presence request frames. The Presence Parameters Element field contains the Presence Parameters sub-elements.

The allowed Presence Parameters sub-elements for a Presence Parameters element that is included in the Presence Response frame includes Radio Information, Timing Measurement, Motion, Location Data, Location Descriptor, Presence statusLocation Source Identifier and Vendor Specific Information.

FIG. 23 is the flowchart of the communicating method according to another embodiment.

Referring to FIG. 23, in the communicating method 70 according to another embodiment, the station 12 or the access point 14 may send an Presence Request frame to provide its own location data and location capability through the wireless network, for example the wireless LAN. The other station 12 or the access point 14 may receive this Presence Request frame through the wireless network.

The other station 12 or the access point 14 may send the ACK (acknowledge) for the Presence Request in response to the presence request after receiving the presence request.

Figures 24, 25:
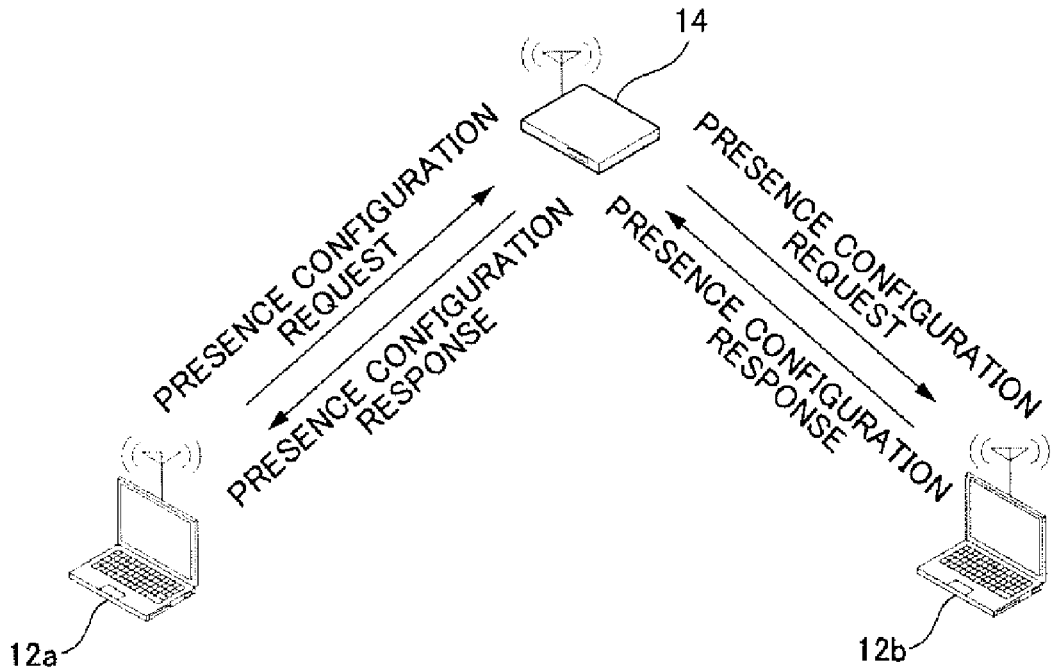
FIG. 24 shows the format of the presence request frame.
FIG. 25 shows the system for the wireless network describing the relationship with providers for the presence information according to another embodiment.

The format of the Presence Request frame body including both presence capability and location data is shown in FIG. 24.

The Category field is set to the value indicating the Wireless Network Management category. The Action field is set to the value indicating Presence Request. The Dialog Token field is a nonzero value which identifies the Presence Request/Response transaction. The dialog token is unique for each Presence Request frame sent to a given destination MAC address.

The Response Requested field indicates if a Presence Response frame is requested by the transmitting station. A value of "0" indicates that a Presence Response frame is not requested. A value of "1" indicates that a Presence Response frame is requested in response to the transmitted frame.

The Presence Parameters Element field contains the Presence Parameters sub-elements. The allowed Presence Parameters sub-elements for a Presence Parameters element that is included in the Presence Request frame includes Location Data field in FIG. 14 together with Radio Information in FIG. 10, Motion in FIG. 12, Location Descriptor in FIG. 13, table 9 to 14, Presence Request Options in FIG. 7 and table 4, Vendor Specific Information.

Also, the allowed Presence Parameters sub-elements for a Presence Parameters element that is included in the Presence Request frame include many kinds of location data so that the station 12 or the access point 14 may provide its own location information for other station 12 or the access point 14.

Of course, before the station 12 transmits the presence request to another station, the station 12 constructs the presence request containing a presence parameters information element, wherein the presence parameters information element comprises a location descriptor to provide its own location capability and a location data to provide its own location information if the station 12 is capable of calculating its own location. Also, after the station 12 transmits the presence request to another station, the station 12 reports the result of the presence request.

In view of the station 12's configuration, the station 12 comprises a constructing means for constructing a presence request, a transmitting means for transmitting the presence request to another station and a reporting means for reporting the result of the presence request.

On the contrary, after the access point 14 receives from the station 12 a presence request, the access point 14 processes presence action on basis of the presence request and transmits the presence response if there is a request that the presence response be sent to the station 12, in response to the received presence request. Finally, the access point reports the result of the presence response In view of the access point's 14 configuration, the access point 14 comprises a receiving means for receiving from a station a presence request, a processing means for processing presence action, a transmitting means for transmitting a presence response and a reporting means for reporting the result of the presence response.

As a result, the station 12 or the access point 14 may provide its own location information for the other station 12 or the access point 14 in the presence request procedure where the station 12 or the access point 14 provides its own presence capability, which can simplify the next presence procedure. To provide its own location information in advance has the effect to minimize or control the load of the station 12 or the access point 14 in the next presence procedure. Therefore, the user for the station 12 or the access point 14 gets the presence service quickly if needed.

To maintain the previous fields in the Presence Request frame and the Presence Response frame except for including the location descriptor field or the location data field keeps the Presence Request frame and the Presence Response frame and its own presence capability and location data in advance.

Provider for the Presence Information and Order

The above-described embodiments add all or part of presence parameters information elements including location descriptor field and location data to the beacon, the probe request, the probe response, the presence configuration request, the presence request, and the presence response, which can provide the presence capability and location data in advance.

The provider which provides the presence capability and location data in the presence parameters information for other station or the access point may be either the station 12 or the access point 14 in FIGS. 1A and 1B. FIG. 25 shows one example where the provider may be either the station 12 or the access point 14.

FIG. 25 shows one example where the first station 12a wishes to know the presence capability for the second station 12b when the first and the second stations 12a or 12b can exchange data with each other through the access point 14.

Referring to FIG. 25, the first station 12a sends to the access point 14 the presence configuration request frame including the location descriptor in the presence parameters information elements. As a result, the access point 14 and the second station 12b becomes to know the presence capability for the first station 12a before the presence service.

On the contrary, the second station 12b can send the presence configuration response frame with its own presence capability to the first station 12a through the access point 14.

Of course, the presence configuration request and response frames may include the location data as well as the presence capability for the station. Two stations 12a or 12b and the access point 14 get to know the presence capability and location date for two stations 12a or 12b in advance.

The access point 14 can also provide its own presence capability and location data for two stations 12a or 12b by using the presence configuration request or response frames. Two station 12a or 12b can calculate their location data by using the location data for the access point 14.

Two station 12a or 12b and the access point 14 can provide their presence capability and location data with each other in advance by using the presence request frame as well as the presence configuration request and/or response frames.

Two station 12a or 12b and the access point 14 can exchange their presence capability and location data with each other in advance by using the beacon, the probe request or the probe response frame in FIGS. 17 and 18 before the association procedure.

The communicating method according to another embodiment as described in FIG. 25 comprises transmitting the presence parameters information elements including the location information for one station without request of its location data, and receiving the presence parameters information elements for other station through the wireless network.

In other words, the station 12 can advertise presence information for the station 12 in a wireless communication system. The station 12 constructs a data including a presence parameters information element, wherein the presence parameters information element comprises either a location descriptor to provide its own location capability or a location data to provide its own location information if the station is capable of calculating its own location and then transmits the presence parameters information elements including either the location descriptor or the location data for one station without request of either its location descriptor or its location data to advertise its location information to other station. And the station 12 then reports the result of transmitting the data.

Of course, the station 12 comprises many kinds of means for the above procedure. The means for performing the procedure related to presence services may be implemented by software, hardware or their combination in the station 12.

The presence parameters information element is included in one or more of the beacon, the probe request, the presence configuration request, the presence request, the association request or the reassociation request One or more of the beacon, the probe request, the presence configuration request, the presence request, the association request or the reassociation request may comprise the allowed or supported presence parameters information elements. Transmitting the allowed or supported presence parameters information elements may be comprised in one or more of the beacon, the probe request, the presence configuration request, the presence request, the association request or the reassociation request procedures.

Priority of the Presence Information

The above-described embodiments add all or part of presence parameters information elements including location descriptor field and location data to the beacon, the probe request, the probe response, the presence configuration request, the presence request, and the presence response, which can provide the presence capability and location data in advance.

When one station receives the presence capability and the location data for other station through the above described frames, the priority of the presence information may be the order of the presence response frame, the presence request frame, the presence configuration response frame, the presence request frame, the beacon, the probe request or the probe response frame. If the station 12 or the access point 14 receives new presence related frame with higher priority than old presence related frame, old configuration is canceled and now configuration is started.

When the presence related frames are unincated and broadcasted, the unicated frames may have higher priority than broadcasted. For example, when unicated presence configuration response frame and broadcasted presence configuration response frames are received, the unicated presence configuration response frame may have higher priority than the broadcasted.

Although the above described embodiments are described, the present invention is not limited thereof.

The embodiments of the present invention have been described for illustrative purposes, and those skilled in the art will appreciate that various modifications, additions and substitutions are possible without departing from the scope of the present invention should be defined by the appended claims and their legal equivalents.

The embodiments of the present invention have been described for illustrative purposes, and those skilled in the art will appreciate that various modifications, additions and substitutions are possible without departing from the scope of the present invention should be defined by the appended claims and their legal equivalents.

What is claimed is:

1. A method of advertising presence information for a station in a wireless communication system, the method comprising:
   constructing, by the station, a presence parameters information element, wherein the presence parameters information element comprises a location descriptor to provide the station's location capability or a location data to provide the station's location information when the station is capable of calculating the station's location;
   transmitting, by the station to an other station in order to advertise the station's location information, the presence parameters information element comprising the location descriptor or the location data for the station without the other station's request of the station's location descriptor or the station's location data; and
   reporting, by the station to the other station, a result of the station's transmission of the presence parameters information element.

2. The method of claim 1, wherein the presence parameters information element comprises both the location descriptor to provide the station's location capability and the location data to provide the station's location information, and
   the station transmits the presence parameters information element for the station without the other station's request of the station's location descriptor and the station's location data.

3. The method of claim 1, wherein the location data of the presence parameters information element matches a format defined by the location descriptor.

4. The method of claim 1, wherein the presence parameters information element is included in at least one of a beacon, a probe request, a presence configuration request, a presence request, an association request or a re-association request.

5. The method of claim 1, wherein either the station or the other station is the access point that has station functionality.

6. A station in a wireless communication system comprising:
   a constructing means for constructing a presence parameters information element, wherein the presence parameters information element comprises a location descriptor to provide the station's location capability or a location data to provide the station's location information when the station is capable of calculating the station's location;
   a transmitting means for transmitting, to an other station, the presence parameters information element comprising the location descriptor or the location data for the station without the other station's request of the station's location descriptor or the station's location data to advertise the station's location information; and
   a transmitting means for transmitting a result of the transmission of the presence parameters information element to the other station.

7. The station of claim 6, wherein the presence parameters information element comprises both the location descriptor to provide the station's location capability and the location data to provide the station's location information, and the transmitting means transmits the presence parameters information element of the station without the other station's request of the station's location descriptor and the station's location data.

8. The station of claim 6, wherein the location data of the presence parameters information element matches a format defined by the location descriptor.

9. The station of claim 6, wherein the presence parameters information element is included in at least one of a beacon, a probe request, a presence configuration request, a presence request, an association request or a re-association request.

10. The station of claim 6, wherein either the station or the other station is the access point that has station functionality.

* * * * *